United States Patent [19]

Rudisel

[11] Patent Number: 5,180,924
[45] Date of Patent: Jan. 19, 1993

[54] IGNITION SWITCH BYPASS CIRCUIT

[76] Inventor: Rick Rudisel, 7027 S.E. Cypress Ave., Portland, Oreg. 97267

[21] Appl. No.: 749,879

[22] Filed: Aug. 26, 1991

Related U.S. Application Data

[63] Continuation-in-part of Ser. No. 487,912, Mar. 5, 1990.

[51] Int. Cl.⁵ .............................................. B60R 25/10
[52] U.S. Cl. ................................ 307/10.6; 307/10.1; 123/146.5 B; 180/287
[58] Field of Search ........................ 307/9.1-10.8; 180/287; 340/426, 438, 449, 450.3, 456, 825.31, 825.32, 825.34; 123/198 B, 146.5 B, 179 BG, 179.3, 179.5

[56] References Cited

U.S. PATENT DOCUMENTS

| | | | |
|---|---|---|---|
| 4,403,675 | 9/1983 | Cardwell | 180/287 |
| 4,754,838 | 7/1988 | Cody | 180/287 |
| 4,792,792 | 12/1988 | Costino | 340/426 |
| 5,115,145 | 5/1992 | Westburg et al. | 307/10.3 |

Primary Examiner—A. D. Pellinen
Assistant Examiner—David Osborn
Attorney, Agent, or Firm—Mark L. Becker

[57] ABSTRACT

This invention is a circuit for a vehicle which will enable the engine to run, and the heater or air conditioner to operate without the key in the ignition switch by supplying power to the ignition and acessory circuits. The operation starts the vehicle, presses a switch, then removes the key. Now the engine is idling, and the heater or air condition will work, but the vehicle cannot be driven. The circuit automatically shuts off if the vehicle is put into gear. It also shuts off if the vehicle's engine overheats, or looses oil pressure. The vehicle may be driven by reinserting the key into the ignition switch and turning it to the "ON" position. The starter is disabled while the circuit is enabled, in case the operator turns the ignition switch to "START" while turning it to the "ON" position. This prevents damage to the starter and flywheel. The circuit can only be energized while the vehicle's engine is running.

15 Claims, 3 Drawing Sheets

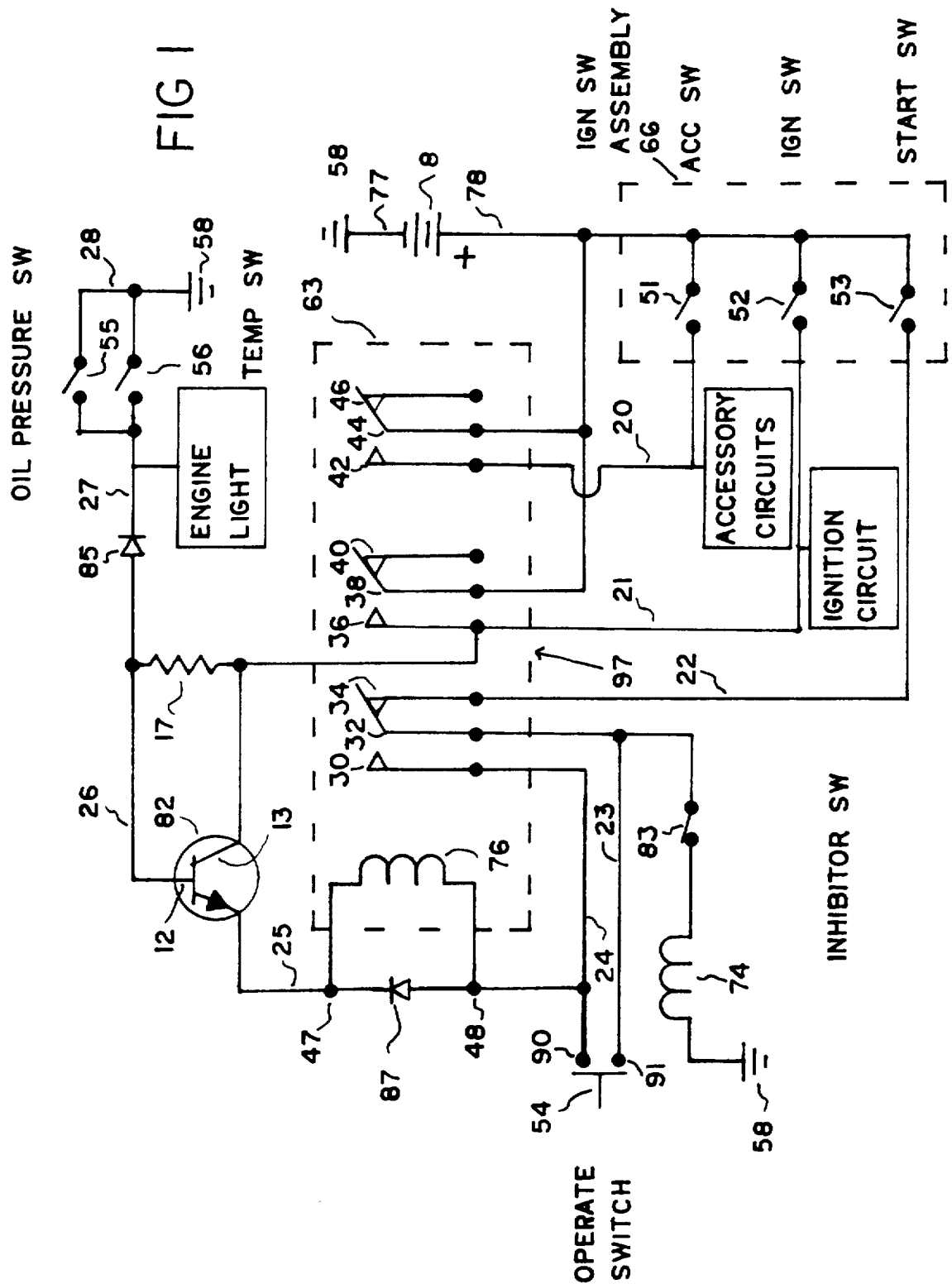

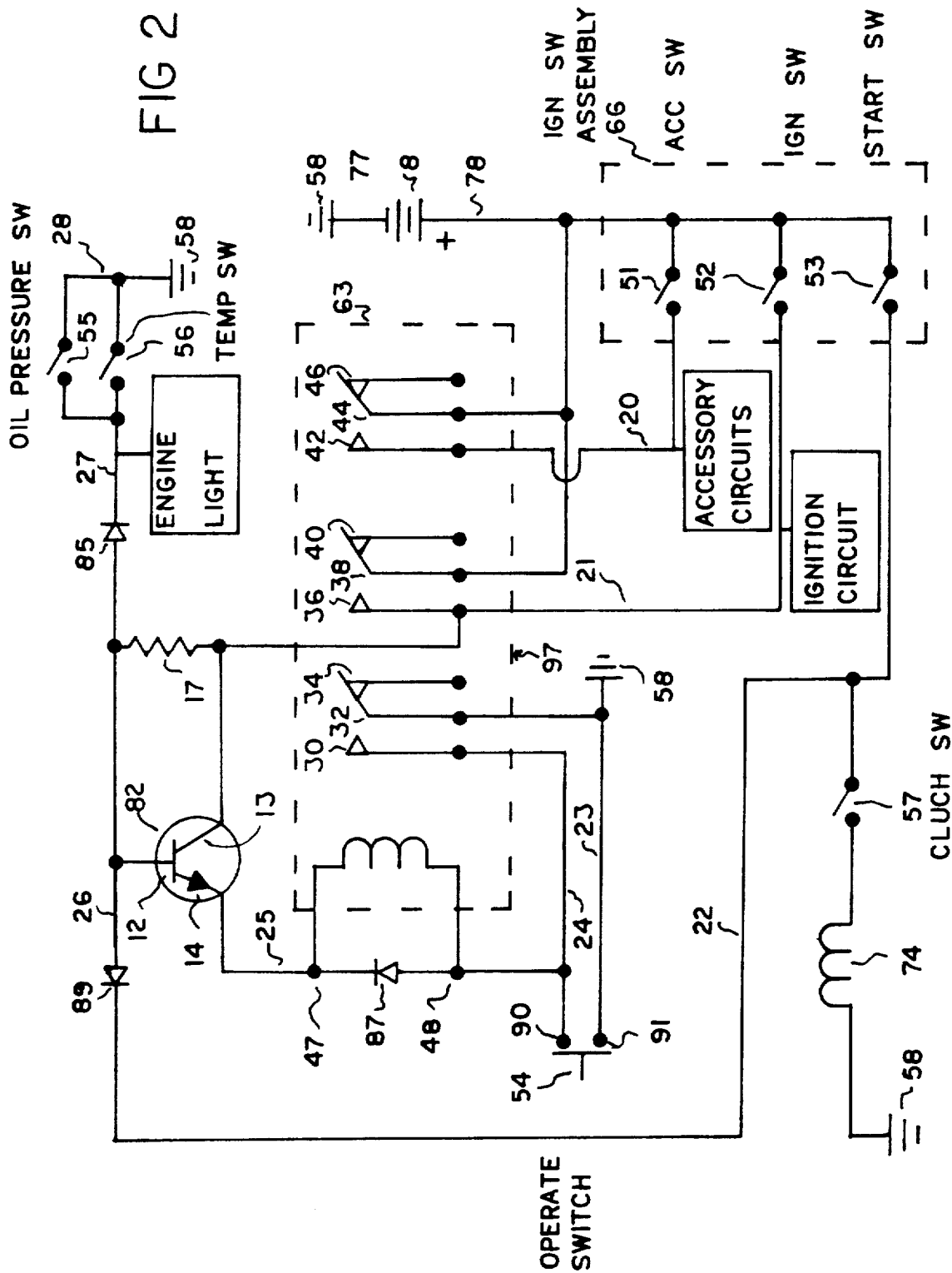

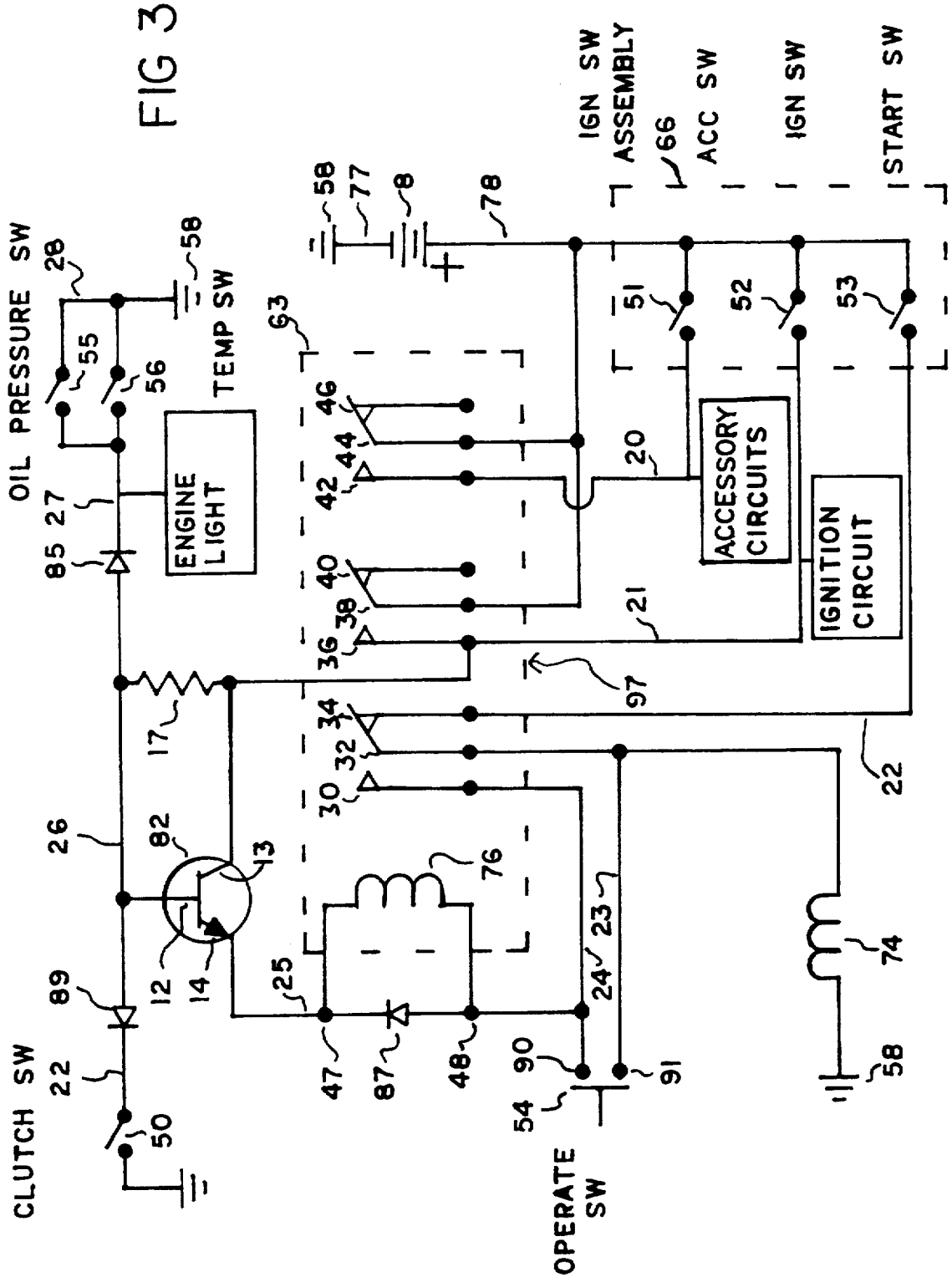

IGNITION SWITCH BYPASS CIRCUIT

This application is a continuation in part of U.S. patent application Ser. No. 07/487,912, filed Mar. 5, 1990, abandoned.

BACKGROUND OF THE INVENTION

This invention relates generally to anti-theft apparatus for vehicles such as an automobile. More particularly, this invention relates to such an apparatus for allowing a vehicle to be left unattended while both the accessory circuit and ignition circuit are operational and the ignition key removed.

Prior vehicle anti-theft devices have inhibited the theft of a vehicle by grounding the negative side of the coil, flashing the lights, and sounding the horn whenever the reverse light is activated, or the brake light is activated. These anti-theft devices suffer from several limitations. First, they require the key to remain in the ignition switch for the ignition circuit to function. Often an operator wishes to leave a vehicle unattended with either the heater or air conditioner operating. Yet both these devices require that the ignition be functioning. Thus prior anti-theft devices would require the key being left in the ignition switch for the vehicle's heater or air conditioner to operate. However, in some states leaving the key in the ignition switch is illegal. Even if not illegal, leaving the key in the ignition switch is risky: the Insurance Institute in New York says 20% of all stolen cars are recovered with the owner's keys in them. Also, your house keys are usually on the same ring and could be stolen. The present invention would eliminate this problem by allowing the ignition circuit and accessory circuit to operate with the ignition key removed.

Second, prior anti-theft devices offer no method of protecting the engine from damage when the vehicle is left unattended with the engine running. The current invention overcomes this limitation by disconnecting the ignition circuit if the engine oil pressure drops or the engine overheats.

Finally, prior anti-theft devices offer no method to disable a vehicle unless the vehicle is driven in reverse or the brake applied. The current invention turns off the engine when the clutch pedal is depressed, or the vehicle's transmission is put into any gear.

SUMMARY OF THE PRESENT INVENTION

It is an object of the present invention to enable a vehicle's engine and accessory circuits to operate with the ignition switch in the "OFF" position and the key removed.

Another object of this invention is to de-energize the vehicle's ignition and accessory circuits if someone attempts to drive the vehicle without re-inserting the ignition switch key, or the vehicle's engine overheats or looses oil pressure.

Another object if the invention is to electrically disable the starter while the device is enabled in case the operator turns the ignition switch to "START" while re-inserting the key and turning it to the "ON" position.

Another object of the invention is to save wear on the vehicle's starter and flywheel when the operator makes frequent stops such as parts deliveries. This also saves wear on engine parts that require a flow of oil such as rings and the camshaft.

Another object of the invention is to provide an ignition switch bypass device which is easily added to a vehicle's existing wiring, economical to manufacture, reliable in usage, and maintenance free.

BRIEF DESCRIPTION OF THE DRAWINGS

FIG. 1 is a schematic diagram illustrating the electrical circuit means of the ignition bypass circuit of this invention comprising of engine control, existing ignition switch, vehicle's existing oil pressure and temperature lamp circuit, starter lockout circuit, and vehicle's existing inhibitor switch for vehicles with an automatic transmission.

FIG. 2 shows the ignition switch bypass circuit of the present invention connected to a vehicle which needs the clutch pedal depressed before the starter will operate.

FIG. 3 shows the ignition switch bypass circuit of the present invention connected to a vehicle, without an inhibitor or factory clutch switch, using an added clutch switch.

DESCRIPTION OF THE PREFERRED EMBODIMENT

Referring specifically to FIG. 1 is the ignition switch bypass device of this invention. The ignition switch assembly 66 includes normally opened switches 51, 52, and 53 which are closed by a key in a conventional manner and normally mounted on the dashboard of the vehicle. The gear shift lever actuates the inhibitor switch 83. This switch prevents a vehicle from being started in gear. A factory installed normally open switch 57 is used on some vehicles with a manual transmission to only allow the vehicle to start when the clutch pedal is fully depressed. For vehicles with a manual transmission and without an inhibitor switch or factory installed clutch switch, a normally closed switch 50 is installed to turn off the ignition switch bypass circuit of the present invention.

The control circuit 97 includes a first, normally closed switch 82 which is an NPN transistor, a second, normally open push button switch 54, and a relay 63. The relay 63 is a twelve volt direct current, triple pole, double throw relay with 10 amp contacts. A normally open switch 52, when closed, energizes control circuit means 97 and the vehicle's ignition circuit. The ignition circuit provides electrical signals for the conventional operation of the internal combustion engine. A normally opened switch 51, when closed, supplies power to the vehicle's accessory circuits such as the heater, air conditioner, wipers, etc. A normally opened switch 53, when closed, supplies power to the vehicle's starter circuit.

The inhibitor switch 83 prevents a vehicle from being started in gear. Current can only flow from the starter switch 53 to the starter solenoid 74 when inhibitor switch 83 is closed. This switch is closed when the vehicle is in neutral or park, for vehicles with an automatic transmission, and open in any other gear. This switch is closed in neutral only for vehicles with a manual transmission. FIG. 1 shows a non energized relay 63 with contact lever members 32,38, and 44 shown in the normally closed position with contacts 34,40, and 46 respectively. The negative terminal of battery 8 is connected by line 77 to ground 58, and the positive terminal is connected by line 78 to the common of the ignition switch assembly 66, and contact lever members 38 and 44 of relay 63. As shown, the ignition switch member 52 is in the normally open condition which is conventional and operable to be closed by the key. An output line 21 from the ignition switch member 52 is connected to the control circuit 97.

When the vehicle's ignition switch 66 is turned to "ON" by the key, switch 51 closes and supplies current to the vehicle's "ACCESSORY" circuits through wire 20. At the same time, switch 52 closes and supplies current through wire 21 to the vehicle's ignition circuit, resistor 17, and the collector 13 of transistor 82. The opposite side of resistor 17 (typically 1,000 ohms) is connected to the anode of diode 85, and the base 12 of transistor 82 by wire 26. Resistor 17 is a pull up resistor which raises the base 12 of transistor 82 to the potential of the battery 8. The transistor 82 is wired in a common collector configuration, and is functioning as a normally closed switch. There is now battery potential (typically 12 volts) on the emitter 14 of transistor 82.

Next, with the vehicle's transmission in "PARK", the operator starts the engine in the conventional manner. The vehicle's ignition switch 66 is momentarily turned to the "START" position. At this time the starter switch 53 closes and current flows through wire 22 to the normally closed contact 34 of relay 63. Using wire 23, the current flows from contact lever member 32, through inhibitor switch 83, through the starter solenoid 74 to ground 58. Now the starter operates and the engine is running, and the ignition switch 66 is returned to the "ON" position. Now contact 91 of switch 54, and contact lever member 32 are at ground potential because of the very low resistance of starter solenoid 74 (4/10 of an ohm), and the inhibitor switch 83 being closed. The ignition switch bypass device is activated by closing push button switch 54. This puts contact 90 of switch 54, wire 24, contact 30, and terminal 48 of coil 76 at ground potential. Current flows through coil 76 to terminal 47 and wire 25 to the emitter 14 of transistor 82 which is at battery potential. Now relay coil 76 energizes moving all three contact lever members 32, 38, and 44 of relay 63 to their normally open contacts 30, 36, and 42 respectively. Contact lever member 32 and contact 30 are in parallel with switch 54 and function as a latching circuit. Now pushbutton switch 54 is released and the contact lever members stay in their normally open positions. Contact 36 is supplying current through wire 21 to the control circuit 97 and the vehicle's ignition circuit. Contact 42 is supplying current to the vehicle's accessory circuits. Now the vehicle's operator turns the ignition switch 66 to the "OFF" position and removes the key. Now the vehicle's engine is running, and accessories such as the heater or air conditioner are functioning.

The vehicle's engine, accessories, and the control circuit 97 will turn off if someone puts the vehicle in gear thus opening inhibitor switch 83. This removes the ground potential from terminal 48 of coil 76. Now coil 76 de-energizes and all of the contact lever members return to their normally closed positions. Now the battery potential (12 volts) is removed from contact 36, and the control circuit 97 is de-energized. Closing the "OPERATE" switch 54 will not re-energize the control circuit 97 until the vehicle's engine is restarted. The vehicle's engine, accessories, and the control circuit 97 also turn off if the vehicle looses oil pressure, or overheats. A normally open (when the engine is running) oil pressure switch 56, and a normally open temperature switch 55 are wired in parallel. When switch 56 closes due to a loss of oil pressure, or switch 55 closes due to the engine over-heating, current flows from ground 58, through wire 28, through switch 55 or 56, and wire 27 to light the "ENGINE" lamp. Current flows through diode 85 by wire 26 to the base 12 of transistor 82. Now the voltage at the anode of diode 85 and the base 12 of transistor 82 drops from battery potential to 6/10 of a volt. The emitter 14 has a potential of one diode voltage drop less (6/10 of a volt) than the base 12. Now the voltage on the emitter 14, wire 25, and terminal 47 of coil 76 is zero volts. Without a potential across the relay coil 76, the contact lever members move to their normally closed contacts, and the control circuit 97 de-energizes. Now the vehicle's engine and accessories turn off.

With the vehicle's engine running, the operate switch 54 pressed, and the control circuit 97 operating, the vehicle's operator can turn the ignition switch 66 to the "OFF" position, remove the key, and exit the vehicle. The vehicle can be driven normally by re-inserting the key into the ignition switch 66 and turning it to the "ON" position. If the operator accidently turns the ignition switch 66 to the "START" position, the starter will not operate because contact lever member 32 is no longer connected to contact 34. This prevents damage to the starter and flywheel. Diode 87 is a counter electromotive force suppressor.

Referring now to FIG. 2 is the ignition switch bypass circuit of the present invention connected to a vehicle which needs to have the clutch pedal depressed before the starter will operate. When the clutch pedal is depressed, switch 57 closes and allows current to flow from the starter switch 53 to the starter solenoid 74. Basically the same circuit is used as in FIG. 1 except contact 32 and contact 91 of switch 54 are connected to ground 58 by wire 23. The control circuit 97 is turned off when the clutch pedal is depressed, closing switch 57. Wire 22 and the cathode of diode 89 are at ground potential because of the low resistance of the starter solenoid 74 to ground 58. Now the voltage at the anode of diode 89 and the base 12 of transistor 82 drops from battery potential to 6/10 of a volt. The control circuit de-energizes as if the engine overheated or lost oil pressure as described earlier.

Referring now to FIG. 3 is the ignition switch bypass circuit of the present invention connected to a vehicle without an inhibitor switch 83 or factory installed clutch switch 57. A normally closed switch 50 must be added to the vehicle so that the clutch pedal in normal position will open switch 50. Basically, the same circuit is used as in FIG. 2 except relay contact lever member 32 and switch contact 91 of switch 54 connect directly to the starter solenoid 74. The control circuit 97 will turn off if someone depresses the clutch pedal thus closing switch 50. Now the cathode of diode 89 is brought to ground potential. The anode of diode 89, wire 22, and the base 12 of transistor 82 drop from battery potential to 6/10 of a volt. The control circuit de-energizes as described earlier.

While the invention has been described in conjunction with preferred specific embodiments thereof, it will be understood this description is intended to illustrate and not to limit the scope of the invention, which is defined by the following claims.

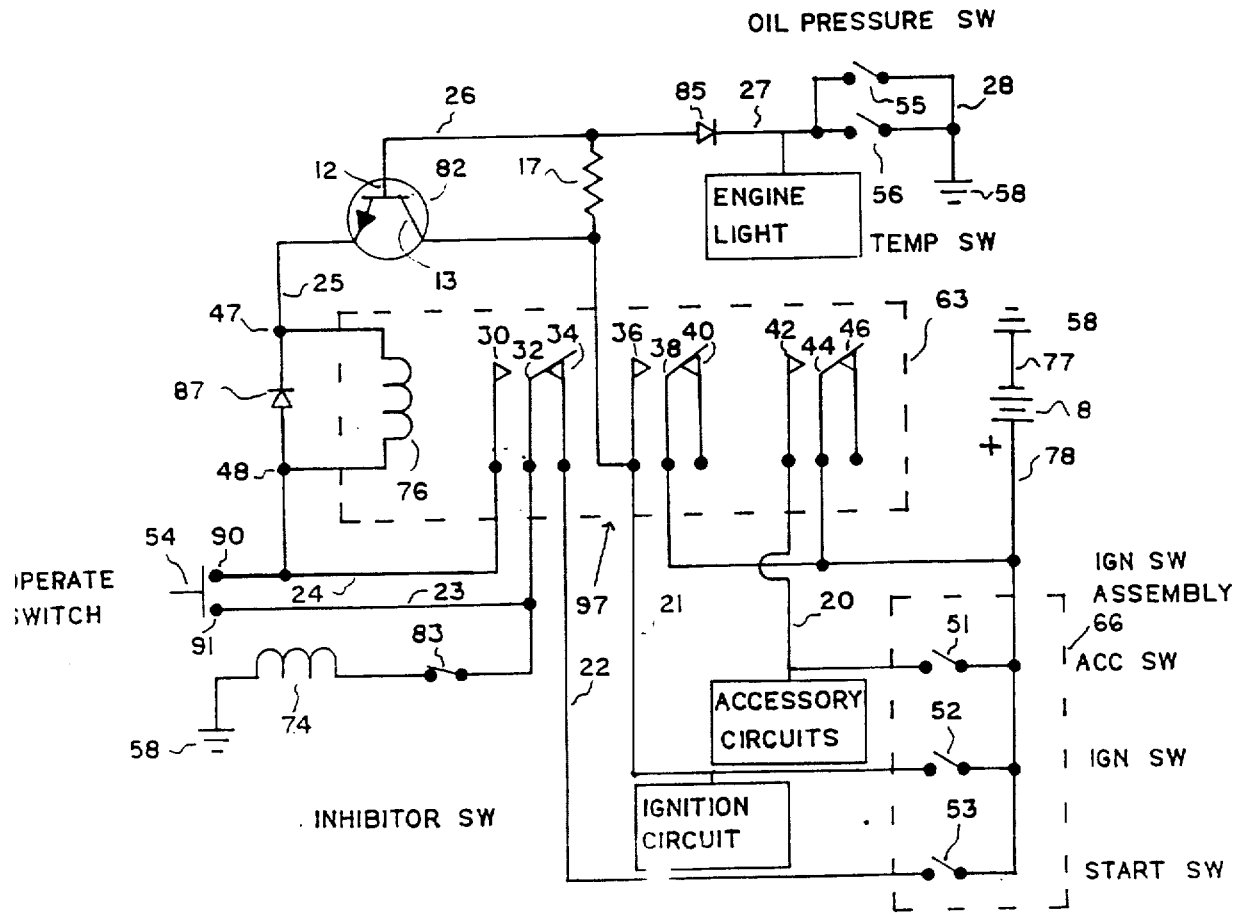

I claim:

1. An ignition switch bypass apparatus for a motor vehicle, the motor vehicle having a battery, an ignition circuit, an accessory circuit, and an ignition switch activated by a key, comprising:

a relay having a coil and multiple sets of contacts connected to the ignition circuit the accessory circuit, and the battery;

a first switch coupled to the ignition switch and the one end of the relay coil, the battery supplying current to the first switch for the coil through the ignition switch;

a second switch coupled to the other end of the relay coil and operable with the first switch to energize the relay coil to connect the battery to the ignition circuit, accessory circuit, and first switch while bypassing the ignition switch, thereby allowing the key to be removed from the ignition switch with the motor vehicle continuing in operation; and an inhibitor switch that changes state to de-energize the relay coil and disconnect the battery from the accessory circuit, ignition circuit, and first switch if an attempt is made to put the vehicle in gear wherein a starter circuit of the vehicle is connected to the ignition switch through the relay while the coil is de-energized, and is disconnected from the ignition switch while the coil is energized, and the first switch is normally closed and is opened to deenergize the coil in response to detection of, low oil pressure or overheating of the motor vehicle.

2. The apparatus of claim 1 wherein the first switch is normally closed and is opened to de-energize the coil in response to a change in state of the inhibitor switch.

3. The apparatus of claim 1 wherein the inhibitor switch is serially connected to the coil.

4. The apparatus of claim 1 wherein the second switch is a push button switch.

5. The apparatus of claim 1 wherein the first switch is a transistor.

6. The apparatus of claim 1 wherein the inhibitor switch is constructed to prevent the motor vehicle from being started in gear.

7. The apparatus of claim 1 wherein the inhibitor switch is a clutch switch.

8. An ignition switch bypass apparatus for a motor vehicle, the motor vehicle having a battery, an ignition circuit, and accessory circuit, and an ignition switch activated by a key, comprising:

a relay having a coil and multiple sets of contacts connected to the ignition circuit, the accessory circuit, and the battery, one end of the relay coil coupled to the ignition switch;

a pushbutton switch coupled to the other end of the relay coil and operable to energize the relay coil to connect the battery to the ignition circuit, accessory circuit, and relay coil while bypassing the ignition switch, thereby allowing the key to be removed from the ignition switch with the motor vehicle continuing in operation;

an inhibitor switch in series with the relay coil that prevents the motor vehicle from being started in gear, the inhibitor switch changing state to de-energize the relay coil and disconnect the battery from the accessory circuit, ignition circuit, and relay coil if an attempt is made to put the vehicle in gear; and a first switch coupled between the relay coil and ignition switch, the first switch opening to de-energize the coil in response to detection of low oil pressure or overheating of the motor vehicle.

9. The apparatus of claim 8 wherein the inhibitor switch is coupled to the first switch.

10. The apparatus of claim 8 wherein a starter circuit of the vehicle is connected to the ignition switch through the relay while the coil is de-energized and is disconnected from the ignition switch while the coil is energized.

11. The apparatus of claim 8 wherein the inhibitor switch is a clutch switch.

12. An ignition switch bypass apparatus for a motor vehicle, the motor vehicle having a battery, an ignition circuit, and accessory circuit, and an ignition switch activated by a key, comprising:

a relay having a coil and multiple sets of contacts connected to the ignition circuit, the accessory circuit, the starter circuit and the battery;

a transistor coupled to the ignition switch and to one end of the relay coil, the battery supplying current to the transistor for the coil through the ignition switch;

a push button switch coupled to the other end of the relay coil and operable with the transistor to energize the relay coil to connect the battery to the ignition circuit, accessory circuit and transistor while bypassing the ignition switch, thereby allowing the key to be removed from the ignition switch with the motor vehicle continuing in operation;

an inhibitor switch that changes state to de-energize the relay coil and disconnect the battery from the accessory circuit, ignition circuit and transistor if an attempt is made to put the vehicle in gear; and a switch coupled to the transistor which changes state in response to a change in oil pressure in or overlapping of the motor vehicle to disable the transistor and thereby de-energize the coil.

13. The apparatus of claim 12 wherein the inhibitor switch is a clutch switch.

14. The apparatus of claim 12 wherein the inhibitor switch is constructed to prevent the motor vehicle from being started in gear.

15. An ignition bypass switch for a motor vehicle having a battery, an ignition circuit, and a key - activated ignition switch, comprising:

a bypass switch means which bypasses the ignition switch for connecting the battery to the accessory and ignition circuits, a driver actuatable switch, sensor means sensing at least two of placing the vehicle in gear, engine overheating, and oil pressure loss, and control means receiving the driver actuable switch and the sensor means as inputs and controlling the bypass switch means such that the bypass switch means is closed or made conductive in response to actuation of the driver actualable switch and the bypass switch means is opened or made nonconductive in response to the sensor means sensing at least one of placing a vehicle in gear, engine overheating, and oil pressure loss, wherein a driver may remove a key from the ignition and have the vehicle remain in a running condition.

* * * * *

UNITED STATES PATENT AND TRADEMARK OFFICE
CERTIFICATE OF CORRECTION

PATENT NO.   : 5,180,924

DATED        : January 19, 1993

INVENTOR(S)  : Rick Rudisel

It is certified that error appears in the above-identified patent and that said Letters Patent is hereby corrected as shown below:

Title page, item [76] Inventor's address should read
  --7550 S.E. Harney, Portland, Oreg. 97267--.

Signed and Sealed this

Twenty-fifth Day of May, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,180,924

DATED : January 19, 1993

INVENTOR(S) : Rick Rudisel

It is certified that error appears in the above-indentified patent and that said Letters Patent is hereby corrected as shown below:

The Title page, showing an illustrative fig., should be deleted and substituted therefor the attached Title page.

Signed and Sealed this

Sixteenth Day of May, 1995

Attest:

BRUCE LEHMAN

Attesting Officer

Commissioner of Patents and Trademarks

United States Patent [19]

Rudisel

[11] Patent Number: 5,180,924
[45] Date of Patent: Jan. 19, 1993

[54] IGNITION SWITCH BYPASS CIRCUIT

[76] Inventor: Rick Rudisel, 7027 S.E. Cypress Ave., Portland, Oreg. 97267

[21] Appl. No.: 749,879

[22] Filed: Aug. 26, 1991

Related U.S. Application Data

[63] Continuation-in-part of Ser. No. 487,912, Mar. 5, 1990.

[51] Int. Cl.⁵ .............................................. B60R 25/10
[52] U.S. Cl. ............................... 307/10.6; 307/10.1; 123/146.5 B; 180/287
[58] Field of Search ..................... 307/9.1–10.8; 180/287; 340/426, 438, 449, 450.3, 456, 825.31, 825.32, 825.34; 123/198 B, 146.5 B, 179 BG, 179.3, 179.5

[56] References Cited

U.S. PATENT DOCUMENTS

| | | | |
|---|---|---|---|
| 4,403,675 | 9/1983 | Cardwell | 180/287 |
| 4,754,838 | 7/1988 | Cody | 180/287 |
| 4,792,792 | 12/1988 | Costino | 340/426 |
| 5,115,145 | 5/1992 | Westburg et al. | 307/10.3 |

Primary Examiner—A. D. Pellinen
Assistant Examiner—David Osborn
Attorney, Agent, or Firm—Mark L. Becker

[57] ABSTRACT

This invention is a circuit for a vehicle which will enable the engine to run, and the heater or air conditioner to operate without the key in the ignition switch by supplying power to the ignition and acessory circuits. The operation starts the vehicle, presses a switch, then removes the key. Now the engine is idling, and the heater or air condition will work, but the vehicle cannot be driven. The circuit automatically shuts off if the vehicle is put into gear. It also shuts off if the vehicle's engine overheats, or looses oil pressure. The vehicle may be driven by reinserting the key into the ignition switch and turning it to the "ON" position. The starter is disabled while the circuit is enabled, in case the operator turns the ignition switch to "START" while turning it to the "ON" position. This prevents damage to the starter and flywheel. The circuit can only be energized while the vehicle's engine is running.

15 Claims, 3 Drawing Sheets